United States Patent
Cakulev et al.

(10) Patent No.: US 10,264,485 B2
(45) Date of Patent: Apr. 16, 2019

(54) POLICY CONTROL AND CHARGING TRIGGERED QUALITY-OF-SERVICE MODIFICATION FOR DELAY TOLERANT CONNECTIONS

(71) Applicant: Verizon Patent and Licensing Inc., Arlington, VA (US)

(72) Inventors: Violeta Cakulev, Millburn, NJ (US); Sudhakar Reddy Patil, Flower Mound, TX (US); Lalit Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 15/607,938

(22) Filed: May 30, 2017

(65) Prior Publication Data

US 2018/0352469 A1 Dec. 6, 2018

(51) Int. Cl.
| | |
|---|---|
| *H04W 28/02* | (2009.01) |
| *H04W 28/04* | (2009.01) |
| *H04W 52/02* | (2009.01) |
| *H04W 72/12* | (2009.01) |
| *H04L 5/00* | (2006.01) |
| *H04W 24/04* | (2009.01) |
| *H04W 36/20* | (2009.01) |

(52) U.S. Cl.
CPC ....... *H04W 28/0268* (2013.01); *H04W 28/04* (2013.01); *H04W 52/0235* (2013.01); *H04W 72/1231* (2013.01); *H04L 5/0058* (2013.01); *H04W 24/04* (2013.01); *H04W 36/20* (2013.01)

(58) Field of Classification Search
None
See application file for complete search history.

(56) References Cited

U.S. PATENT DOCUMENTS

2017/0231020 A1* 8/2017 Tomici ............... H04W 12/06
2017/0265245 A1* 9/2017 Yang ................ H04W 76/20

* cited by examiner

*Primary Examiner* — Mohammad S Adhami

(57) ABSTRACT

A device may: receive, from a first network device, an indication that a user equipment device (UE) has established an Internet Protocol (IP) session through a network; subscribe to a notification service, at the first network device, that indicates whether the UE is reachable; determine that quality-of-service (QoS) for the UE needs to be modified; send a first request, to the first network device, to modify a bearer for the UE in response to the determination that the QoS for the UE needs to be modified; receive a first reply, from the first network device, that the QoS for the UE has failed because the UE is unreachable; receive a notification, from the notification service at the first network device, that the UE is reachable; determine whether the QoS for the UE still needs to be modified in response to the notification; and send a second request to the first network device in response to determining whether the QoS for the UE still needs to be modified.

20 Claims, 8 Drawing Sheets

POLICY CONTROL AND CHARGING TRIGGERED QUALITY-OF-SERVICE MODIFICATION FOR DELAY TOLERANT CONNECTIONS

BACKGROUND INFORMATION

In recent years, with the advent of smart phones, service providers have been witnessing increasing use of services over wireless networks. In contrast to communication sessions over wireline networks, however, wireless communication sessions are more easily disrupted due to noise, occluded signals, interference, etc. Furthermore, connectivity of smart phones is more easily affected by constantly changing state of the phones, such as its location, its mode (e.g., power savings mode), etc.

DETAILED DESCRIPTION OF PREFERRED EMBODIMENTS

Figure 1:
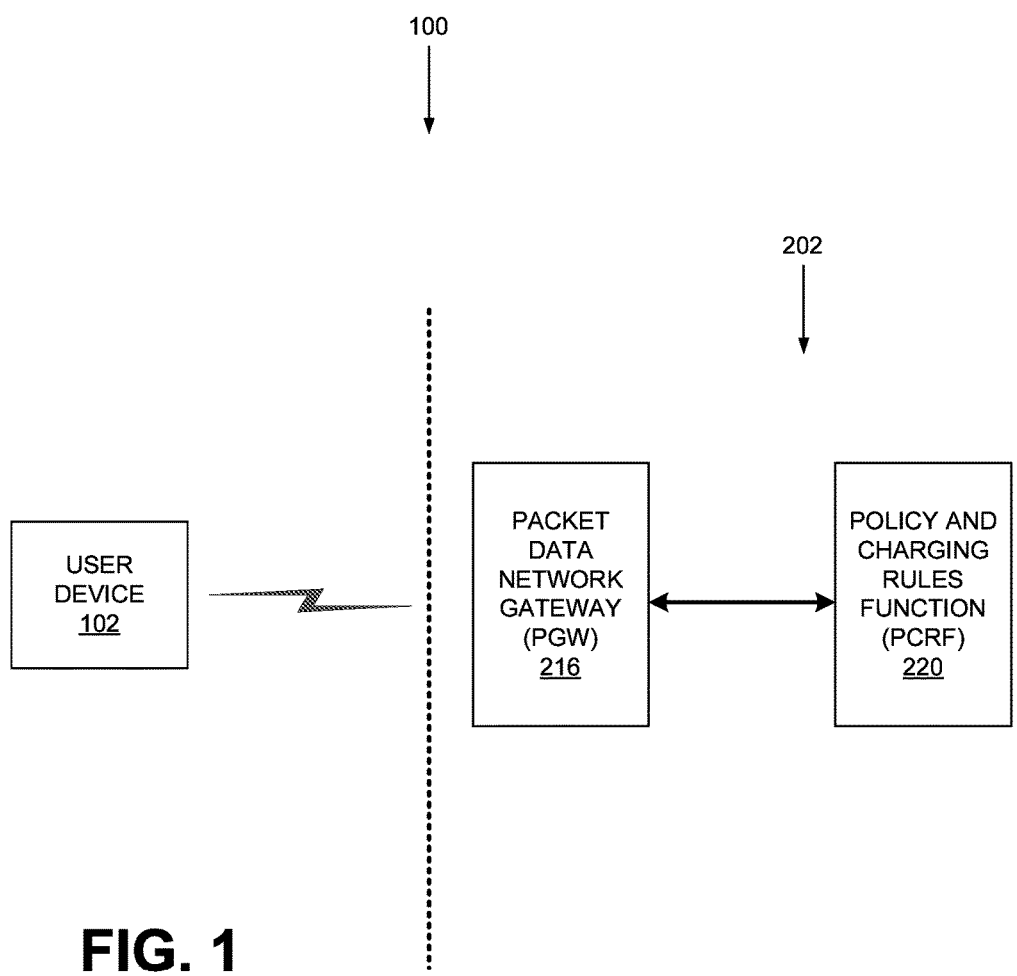
FIG. 1 illustrates the concepts described herein.

The following detailed description refers to the accompanying drawings. The same reference numbers in different drawings may identify the same or similar elements.

To satisfy the needs of Machine Type Communications, Third Generation Partnership Project (3GPP) standards define functions to handle mobile terminated (MT) communication with a user equipment device (UE) being unreachable while using power savings functions such as Power Saving Mode (PSM) or Extended Discontinuous Reception (eDRX).

PSM is similar to power-off. In PSM, the UE remains registered with the network and there is no need to re-attach or re-establish Packet Data Network (PDN) connections. A UE in PSM, however, is not immediately reachable for mobile terminating services. More specifically, a UE using PSM is available for mobile terminating services during the time it is in connected mode and for the period of an Active Time after the connected mode. The connected mode is caused by a UE originated event like data transfer or signaling. Thus, PSM is intended for UEs that are expecting only infrequent mobile originating and terminating services and that are delay tolerant (i.e., can accept a corresponding latency in the mobile terminating communication).

eDRX is negotiated between the UE and the network to reduce power consumption by the UE, while remaining available for mobile terminating data and/or network originated procedures, within a certain delay that is dependent on the eDRX cycle value.

For a UE in PSM or that has negotiated the eDRX, there are mechanisms in the network to indicate when the UE is temporarily not reachable or once it becomes available. For example, a Mobility Management Entity (MME) will send a Network Triggered Service Request for the UE and start a timer. If the MME does not receive a response from the UE before the timer expires, the MME will send an Update Bearer Response message with a rejection cause to the corresponding Serving Gateway (SGW), indicating that the UE is temporarily not reachable. The rejection message is forwarded by the SGW to the Packet Data Network Gateway (PGW), and the PGW will hold or delay mobile terminated procedures until the PGW receives a subsequent message indicating that the UE is available for end-to-end signaling.

In embodiments described herein, given procedures that are held or deferred due to UE non-reachability, the PGW reattempts to execute the procedures when the UE becomes reachable. For example, in the case of Policy Charging and Rules Function (PCRF)-triggered Quality-of-Service (QoS) modification procedure, the PCRF installs/deletes/modifies Policy Control and Charging (PCC) rules through the PGW.

More specifically, when a UE becomes temporarily unavailable, a PCRF relies on the PGW communicating to the PCRF that a QoS modification attempt failed due to the UE being temporarily unreachable. In one embodiment, the PCRF may subscribe to be notified by the PGW once the UE is available for end-to-end signaling such that the PCRF can decide whether the QoS modification is still appropriate. If a QoS modification is still appropriate or if different modification is needed, the PCRF can communicate appropriate PCC rules to the PGW in response to the notification. By applying the QoS modifications, the PCRF and PGW allow network resources (e.g., bandwidth) to be allocated for appropriate bearers, which improves the overall performance of the network.

FIG. 1 illustrates concepts 100 described herein. According to FIG. 1, concepts 100 include a user device ("user equipment device" or "UE") 102 that establishes a session over a PGW 216 in a service provider network 202, which also includes a PCRF 220. Many details of user device 102, network 202, PGW 216, and PCRF 220 are omitted in the following description of FIG. 1, but are provided below with reference to FIGS. 2-6.

In FIG. 1, when user device 102 opens a session via PGW 216, PCRF 220 subscribes to a service, offered by PGW 216, to be notified of reachability status of user device 102. When PCRF 220 decides to change the QoS for user device 102, PCRF 220 sends a QoS modification request to PGW 216, which then attempts to implement or initiate the requested QoS change. If user device 102 is unreachable from within network 202, PGW 216 notifies PCRF 220. In response, PCRF 220 memorizes ("holds") its QoS modification attempt. Later, when user device 102 becomes reachable from network 202, PGW 216 notifies PCRF 220 that user device 102 is reachable. In response, PCRF 220 attempts to effect the deferred QoS change.

One consequence of making the QoS change at the earliest possible moment (i.e., when user device 102 becomes reachable) is that user device 102 may be assigned a bearer that best suits its QoS requirements. If user device 102 remained at the prior, incorrect QoS, user device 102 may receive worse or better service (at the expense of other user devices in network 202) than user device 102 deserved, neither of which would be optimal from a service perspective (e.g., one user device is unfairly treated better than others at their expense) or a network perspective (e.g., incorrect bandwidth allocation).

Figure 2:
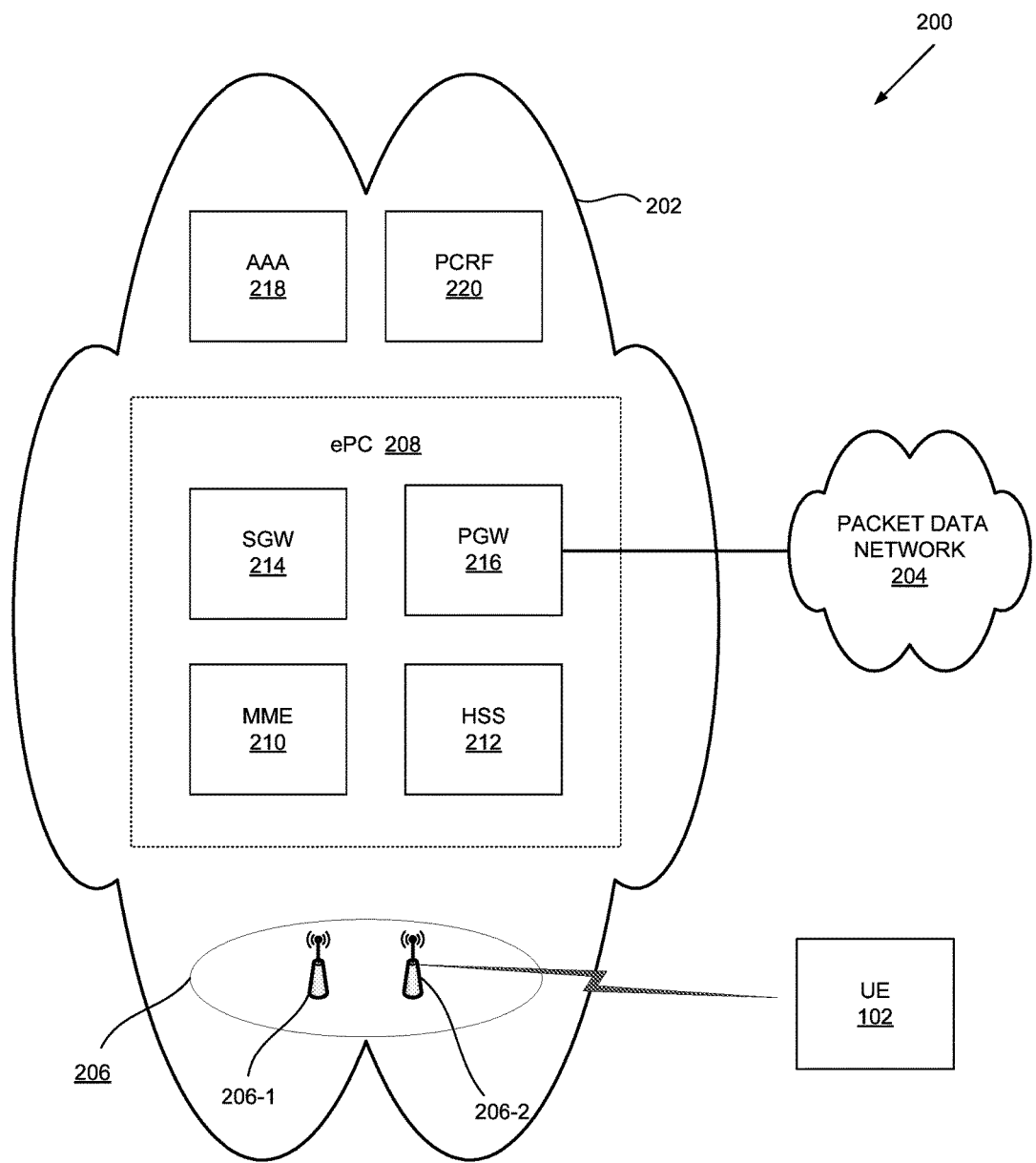
FIG. 2 illustrates an exemplary environment in which concepts described herein may be implemented.

FIG. 2 illustrates an exemplary environment 200 in which concepts 100 can be implemented. As shown, environment 200 includes user device 102, network 202 (also referred to as "mobile service provider (MSP) network"), and packet data network 204. Depending on the implementation, environment 200 may include additional or fewer components than those illustrated in FIG. 2. For example, in a different embodiment, environment 200 may include millions of user devices and/or additional wireless networks.

User device 102 may include an electronic device having communication capabilities. For example, user device 102 may include a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, a digital camera that includes communication capabilities (e.g., wireless communication mechanisms), or Internet-of-Things (IoTs). In a long-term evolution (LTE) environment, user device 102 may be referred to as user equipment (UE), as indicated above with respect to FIG. 1.

In FIG. 2, user device 102 may establish and participate in a communication session with other devices (not shown). To start, user device 102 may attach to network 202 via radio access network (RAN) through a base station, and then establish an IP session with an access point. Such a session may be referred to as an IP-Connectivity Access Network (IP-CAN) session.

In some situations, while user device 102 has established a session and is holding onto one end of the session, user device 102 may become inaccessible. In one example, user device 102 may experience signal degradations, or become unable to receive signals. In another example, user device 102 may enter PSM or eDRX. In either case, user device 102 remains registered with network 202, as such, there is no need to re-attach or re-establish a connection with PDN 204. For eDRX, user device 102 may negotiate the amount of time for which user device 102 can be active/dormant.

When user device 102 wants to use PSM, user device 102 may request an Active Time value during an attach procedure, tracking and update (TAU) procedure, and periodic tracking and update (PAU) procedure. A user device in PSM is available for terminating services only for periods of an Active Time after user device 102 originates an event, such as a data transfer or signaling. User device 102 may request a modification to the Active Time from the network to which user device 102 is attached.

PSM mode is intended for user devices that are expecting only infrequent originating and terminating services, and that can accept a corresponding latency in the communication. User device 102 may enter PSM when using the Packet Switched (PS) domain and mobile device-originated IP Multimedia Subsystem (IMS) or circuit switched (CS) services. Neither the IMS nor the CS domain provides support for mobile-terminated CS voice or IMS services for user devices in PSM.

MSP network 202 may include one or more wireless and wireline networks of any type, such as, for example, a local area network (LAN), wide area network (WAN), wireless local area network (WLAN), wireless satellite network, and/or one or more wireless public land mobile networks (PLMNs). The PLMN(s) may include a Code Division Multiple Access (CDMA) 2000 PLMN, Global System for Mobile Communications (GSM) PLMN, Long Term Evolution (LTE) PLMN and/or other types of PLMNs not specifically described herein.

When user device 102 negotiates a PSM and an Active Time, MSP network 202 may provide a value for the Active Time.

Packet data network (PDN) 204 may include a network that supports Internet Protocol (IP)-based communications. PDN 204 may include, for example, an IP Multimedia Subsystem (IMS) network, which may provide voice and multimedia services to user device 102 based on Session Initiation Protocol (SIP).

Depending on the implementation, MSP network 202 may include an LTE network that includes an evolved UMTS Terrestrial Network (eUTRAN) 206, evolved packet core (ePC) 208, Authentication Authorization and Accounting (AAA) server 218, and PCRF 220. As further shown in FIG. 2, ePC 208 may include an MME 210, home subscriber server (HSS) 212, SGW 214, and PGW 216.

eUTRAN 206 may include one or more eNodeBs 206-1 and 206-2 (herein collectively referred to as "eNodeB 206"). eNodeB 206 may include one or more devices and components that allow user device 102 to wirelessly connect to MSP network 202. eNodeB 206-1 and eNodeB 206-2 may each interface with ePC 208 via an Si interface.

MME 210 may provide control plane processing for ePC 208. For example, MME 210 may implement tracking and paging procedures for user device 102, may activate and deactivate bearers for user device 102, may authenticate a user of user device 102, and may interface to non-LTE radio access networks. A bearer may represent a logical channel with particular QoS requirements. MME 210 may also select a particular SGW 214 for a particular user device 102. A particular MME 210 may interface with other MME 210 in ePC 208 and may send and receive information associated with user devices, which may allow one MME to take over control plane processing of user devices serviced by another MME, if the other MME becomes unavailable. During the authentication of user device 102 at MME 210, MME 210 may exchange messages with HSS 212 to authenticate user device 102.

MME 210 may communicate with SGW 214 through an S11 interface. S11 interface may be implemented, for example, using GTPv2. The S11 interface may be used to create and manage a new session for a particular user device 102. The S11 interface may be activated when MME 210 needs to communicate with SGW 214, such as when the particular user device 102 attaches to ePC 208, when bearers need to be added or modified for an existing session for the particular user device 102, when a connection to a new PGW 216 needs to be created, or during a handover procedure (e.g., when the particular user device 102 needs to switch to a different SGW 214).

For instance, assume that user device 102 exits PSM and becomes reachable. Further, assume MME 214 receives a request from PGW 216 to modify its QoS corresponding to UE 102. MME 214 may invoke the S11 interface to communicate with SGW 214 in changing the bearer for user device 102. When user device 102 becomes available, MME 214 may send a Network Triggered Service Request for user device 102 and start a timer. If MME 214 receives no response from user device 102 before the timer expires because user device 102 has entered PSM, MME 214 may send an Update Bearer Response with a rejection cause to PGW 216 (through SGW 214), indicating that user device 102 is temporarily not reachable due to user device 102 being in PSM.

HSS 212 may provide user subscription, registration, and profile information to other components in an LTE, and store such information, at itself or other components (e.g., AAA 218). In one implementation, HSS 212 may store and/or access authentication information at AAA 218. When MME 210 requests HSS 212 for authentication data, HSS 212 may access AAA 218 to retrieve the data and provide it to MME 210.

SGW 214 may provide an access point to user device 102, handle forwarding of data packets for user device 102, perform transport level markings (e.g., QoS Class Identifier (QCI)), and act as a local anchor point during handover procedures between eNodeBs 206. SGW 214 may interface with PGW 216 through an S5/S8 interface.

In addition, SGW 214 may forward messages between MME 210 and PGW 216. For example, when SGW 214 receives a message from MME 210 indicating that user device 102 is unavailable to accommodate a request to change the bearer, SGW 214 may forward the message to PGW 216.

PGW 216 may function as a gateway to PDN 204. In addition, when user device 102 attaches to MSP network 202 (through either eUTRAN 206 or through a wireless network), PGW 216 may allocate an IP address for user device 102. Additionally, when PGW 216 receives a message from PCRF 220 to modify a QoS for user device 102, PGW 216 may dispatch a message to MME 210 (via SGW 214) to change the bearer for user device 102. If MME 210 returns a rejection message (through SGW 214) indicating that user device is in PSM, PGW 216 may defer or hold the request, until PGW 216 receives a message from MME 210 indicating that user device 102 is available for end-to-end signaling. PGW 216 may then notify PCRF 220 of the failure to modify the QoS.

AAA 218 may store and/or provide authentication, authorization, and/or accounting information to components of MSP network 202. In one embodiment, AAA 218 may provide such information in accordance with the DIAMETER protocol.

PCRF 220 may provide policy control decisions and flow based charging control functionalities. PCRF 220 may provide network control regarding service data flow detection, gating, QoS and flow based charging, etc. PCRF 220 may determine how a certain service data flow may be treated, and ensure that user plane traffic mapping and treatment are in accordance with a user's subscription profile. For example, PCRF 220 may identify and apply a user profile related to user device 102 when exchanging data using a conventional handling procedure.

In some implementations, PCRF 220 may store rules and logic pertaining to modifying QoS for user devices. For example, PCRF 220 may indicate who and/or what user devices 102 may be eligible for what QoS under various traffic conditions, user account parameters, etc. When the conditions for triggering a QoS modification are met, PCRF 220 may dispatch a request to modify the QoS to PGW 216. If PGW 216 responds with a rejection message, indicating that user device 102 is unreachable, PCRF 220 may defer the desired modification, and monitor incoming messages from PGW 216 for information relating to user device 102. If PCRF 220 receives a message from PGW 216 indicating that user device 102 is reachable, PCRF 220 may reattempt to modify the QoS.

While FIG. 2 shows exemplary components of networks in environment 100, in other implementations, environment 100 may include fewer components, different components, differently arranged components, or additional components than depicted in FIG. 2. Additionally, or alternatively, one or more components in environment 100 may perform functions described as being performed by one or more other components.

Figure 3:
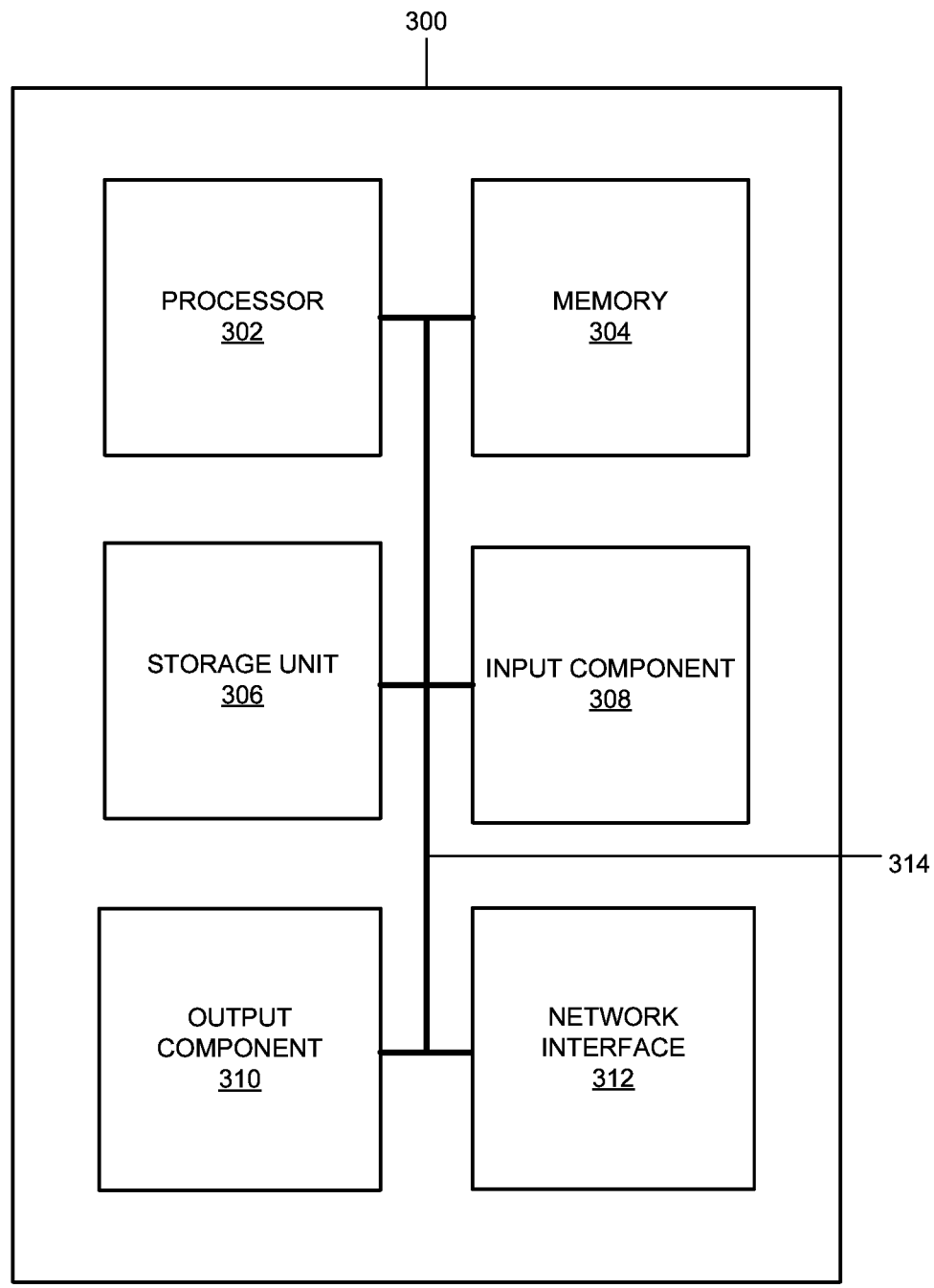
FIG. 3 illustrates exemplary components of the network devices of FIGS. 1 and 2.

FIG. 3 is a block diagram of exemplary components of a network device 300. Network device 300 may correspond to or be included in any of the devices and/or components illustrated in FIG. 1 and FIG. 2 (e.g., user device 102, network 202, network 204, etc.).

As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth interface).

Communication path 314 may provide an interface through which components of device 200 can communicate with one another.

Network device 300 may perform the operations described herein in response to processor 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processor 302, may cause processor 302 to perform processes that are described herein.

For example, when network device 300 is implemented as MME 210, programs on MME 210 may indicate to PGW 216 whether user device 102 is reachable and/or whether a particular bearer modification request has failed or succeeded. In another example, MME 210 may negotiate eDRX with user device 102.

Figure 4A:
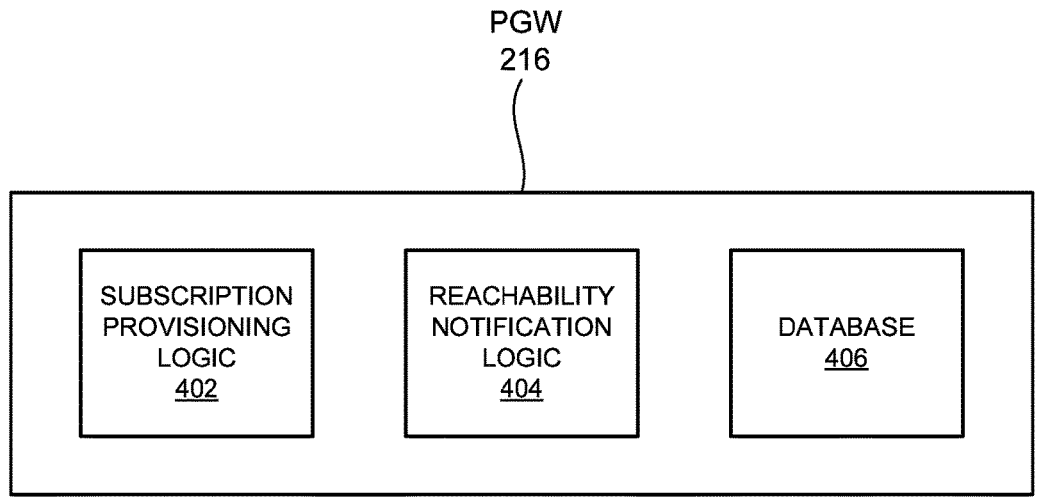
FIGS. 4A and 4B illustrate exemplary functional components of the exemplary Packet Data Network Gateway (PGW) and Policy and Charging Rules Function (PCRF) of FIG. 2.

FIG. 4A illustrates exemplary functional components of PGW 216. As shown, PGW 216 may include subscription provisioning logic 402, reachability notification logic 404, and a database 406. The logic may be part of other software components in PGW 216, or may be implemented as separate components in PGW 216. Although PGW 216 may include additional components, they are not illustrated for simplicity. For example, PGW 216 may include an operating system, a communication program, etc.

Subscription provisioning logic 402 may receive a request from PCRF 220 to notify PCRF 220 about reachability of user device 102 that has established an IP-CAN session. Upon receipt of the request from PCRF 220, subscription provisioning logic 402 may then indicate, in database 406 when the status of user device 1102 changes, from being reachable to unreadable or vice versa. In addition, subscription provisioning logic 402 may receive a request to unsubscribe PCRF 220 from the notification service.

Reachability notification logic 404 may monitor messages that are received from MME 210 (via SGW 214), and determine whether user device 102 is reachable based on the content of the messages. In one implementation, when reachability notification logic 404 determines that user device 102 is not reachable based on the messages, reachability notification logic 404 may further determine whether PCRF 220 has subscribed to subscription provisioning logic 402. If so, reachability notification logic 404 may send a message to PCRF 220 indicating that user device 102 is unreachable. In one implementation, the message may be sent only if a message from MME 210 has been dispatched in response to an immediately preceding failed attempt to change the QoS. In other implementations, notification logic 404 may send the message to PCRF 220 regardless of whether there was a prior attempt to change the QoS.

In some implementations, when PGW 216's attempt to modify the QoS of user device 102 has failed because it is not reachable, reachability notification logic 404 may reattempt to modify the QoS, without receiving another request from PCRF 220. In other implementations, reachability notification logic 404 may reattempt to modify the QoS only when PCRF 220 requests PGW 216 based on the deferred QoS change.

Database 406 may include information indicating whether PCRF 220 has subscribed to the notification service for particular user device 102. Database 406 may include information identifying user device 102 (e.g., International Mobile Equipment Identity (IMEI), tec.).

Figure 4B:
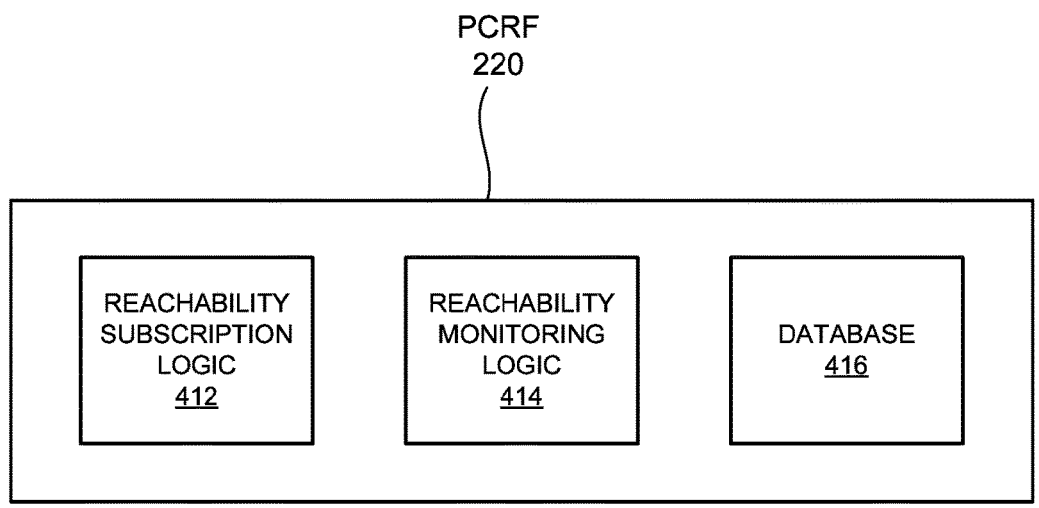

FIG. 4B illustrates exemplary functional components of PCRF 220. As shown, PCRF 220 may include reachability subscription logic 412, reachability monitor logic 414, and a database 416. The logic may be part of other software components in PCRF 220, or may be implemented as separate components in PCRF 220. Although PCRF 220 may include additional components, they are not illustrated for simplicity. For example, like PGW 216, PCRF 220 may include an operating system, a communication program, etc.

Reachability subscription logic 412 may subscribe to a subscription service with PGW 216 when PCRF 220 is notified about an establishment of an IP-CAN session for user device 102 (i.e., subscription logic 412 sends a request to PGW 216). Upon successful subscription, reachability subscription logic 412 may update database 416, indicating the subscription status for user device 102.

Reachability monitor logic 414 may monitor any changes in the reachability status of user device 102 based on incoming messages from PGW 216. When reachability monitor logic 414 detects a change in reachability status of user device 102, reachability monitor logic 414 may record the status in database 416.

When PCRF 220 determines that the QoS for user device 102 should change, reachability monitor logic 414 may look up the reachability status of user device 102 in database 416. If user device 102 is reachable, logic 414 may request PGW 216 to effect the QoS change. If the attempt fails, reachability monitor logic 414 may indicate the failed attempt in database 406. Thereafter, if the reachability status of user device 102 changes, reachability monitor logic 414 may reattempt to change the QoS.

In some implementations, rather than dispatching a request to reattempt to modify the QoS, PCRF 220 may rely on PGW 216 to automatically initiate the QoS change once user device 102 becomes reachable and without additional explicit instruction from PCRF 220. In these implementations, it would be possible for PCRF 220 to cancel a pending request to change the QoS (e.g., because network traffic conditions changed), so that PGW 216 may stop making further attempts to change the bearer associated with user device 102.

Figure 5A:
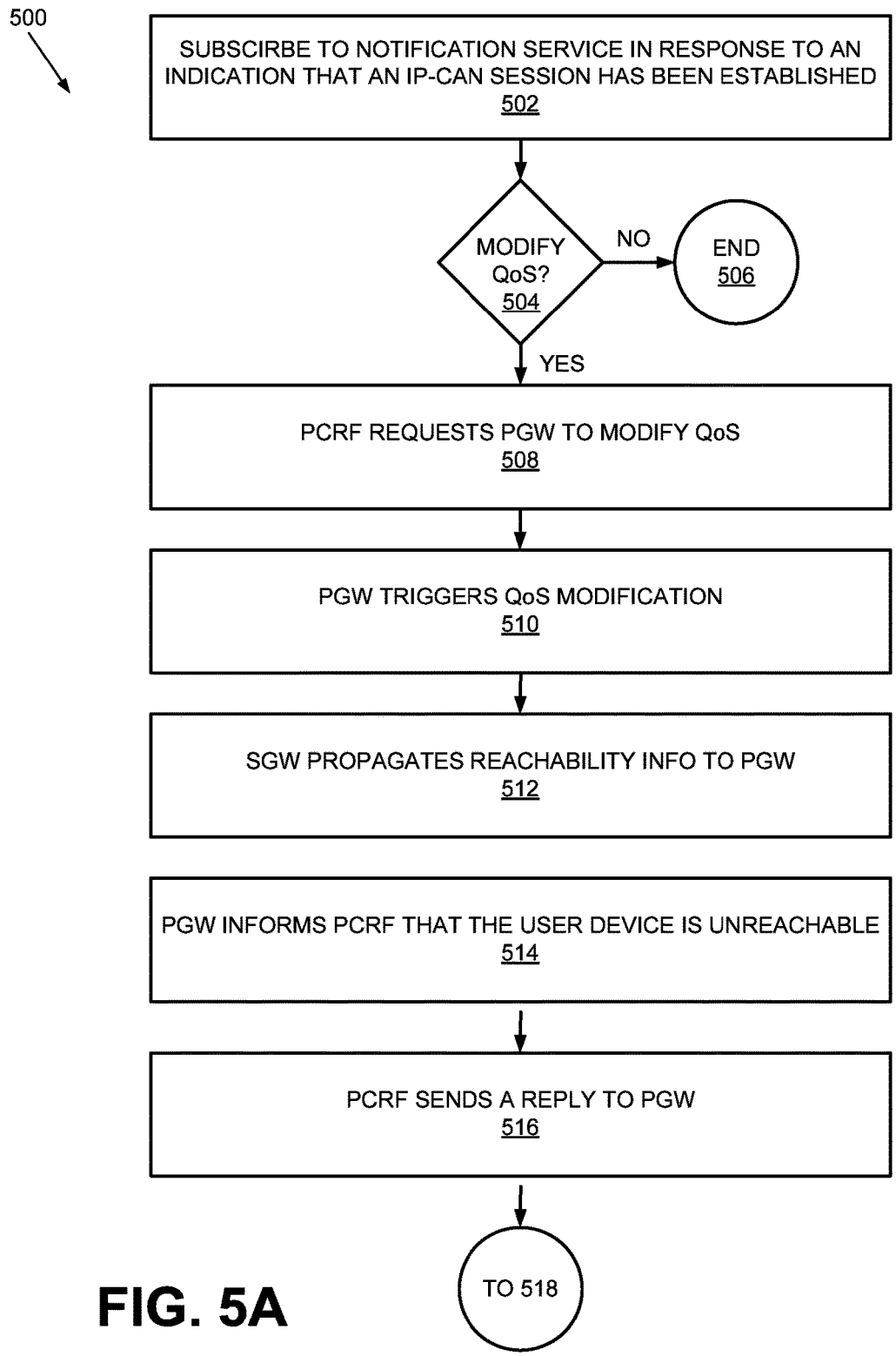
FIGS. 5A and 5B illustrate a flow diagram of an exemplary process that is associated with Policy Control and Charging (PCC) triggered Quality-of-Service (QoS) modifications in networks of FIG. 2 according to one implementation.
Figure 5B:
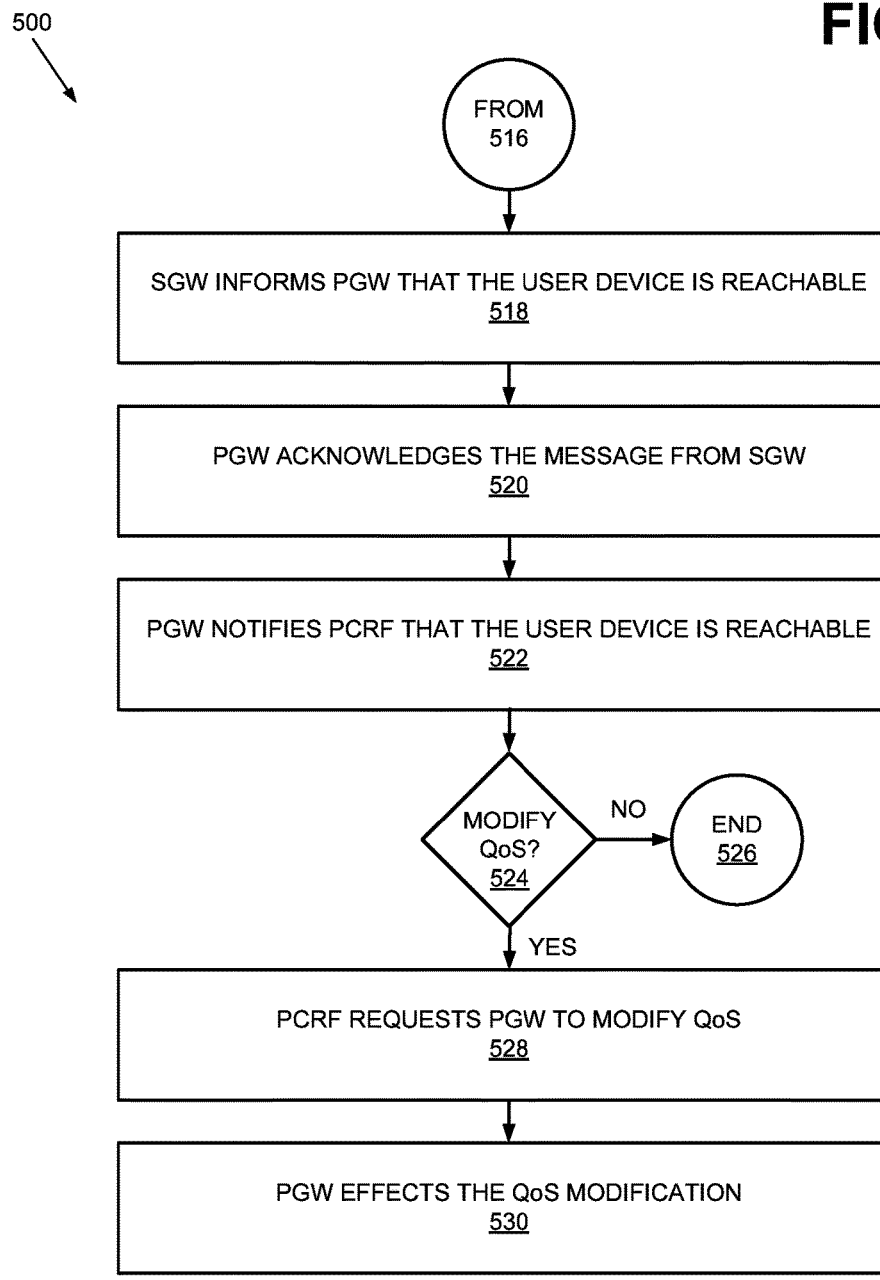
Figure 6:
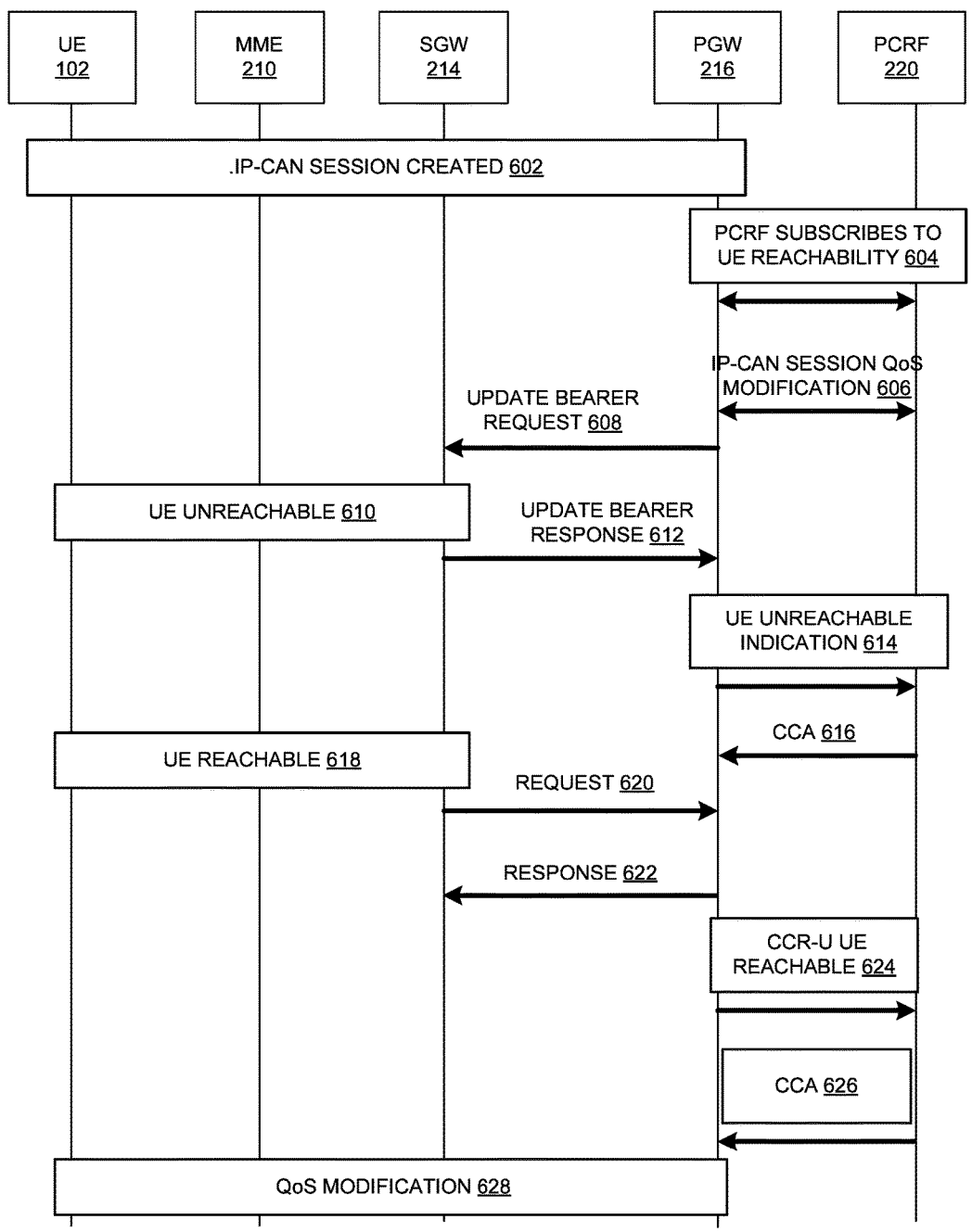
FIG. 6 is an exemplary messaging diagram that is associated with the process of FIGS. 5A and 5B.

FIGS. 5A and 5B illustrate a flow diagram of an exemplary process 500 that is associated with a Policy Control and Charging (PCC) triggered QoS modifications in network 202. Process 500 may be performed by various components of network 202, such as MME 210, SGW 214, PGW 216, and/or PCRF 220. FIG. 6 is an exemplary messaging diagram that is associated with process 500. For process 500, assume that user device 102 has attached to network 202 and established an IP-CAN session with a node in PDN 204 through PGW 216 (item 602 in FIG. 6) and that PCRF 220 has received an indication of the IP-CAN session for user device 102.

As shown in FIG. 5, process 500 may include PCRF 220 subscribing to the reachability notification service at PGW 216, in response to the indication that the IP-CAN session has been established (block 502; IP-CAN session created event in FIG. 6; and item 604).

Process 500 may further include PCRF 220 determining (based on policy and charging rules) whether to modify the QoS for user device 102 (block 504). If PCRF 220 determines that there is no need for a QoS change (block 504—NO), process 500 may end (block 506). Otherwise (block 504—YES), PCRF 220 may request PGW 216 to modify the QoS for user device 102, by sending an Update Bearer Request to SGW 214 (block 508; and message 606 from PCRF 220 to PGW 216).

For blocks 512-516, assume that user device 102 has become unreachable and that SGW 214 learns that user device 102 is not reachable from MME 210. Process 500 may further include SGW 214 propagating reachability information (obtained from MME 210) to PGW 216 (block 512; message 612).

Process 500 further includes PGW 516 informing PCRF 220 that user device 102 is unreachable (block 514; message 614 (e.g., a credit control request (CCR) message)). In response, PCRF 220 may store the information in its database, such that PCRF 220 may later attempt to notify user device 102 when it subsequently becomes reachable. After storing the information, PCRF 220 may send a reply acknowledging the message from PGW 216 (block 516; credit control answer (CCA) message 616).

For blocks 518-528, assume that user device 102 has become reachable (item 618). When SGW 214 learns that user device 102 is reachable (e.g., from MME 210), SGW 214 informs PGW 216 that user device 102 is reachable (block 518; message 620) and PGW 216 provides a response (block 520; message 622). In addition, PGW 216 may send a message (e.g., Credit Control Request Update (CCR-U) message) to PCRF 220, indicating that user device 102 has become reachable (block 522; message 624).

When PCRF 220 receives the message (e.g., message 624) from PGW 216, PCRF 220 may determine whether the QoS needs to be modified for user device 102 (block 524). If so (block 524—NO), process 500 may end (block 526). Otherwise (block 524—YES), PCRF 220 may send a response to PGW 216 (e.g., CCA message 626), requesting PGW 216 to effect initiate the QoS modification (block 526). Thereafter, PGW 216 may prompt the QoS change by signaling SGW 214 (block 528; item 628). SGW 214 and MME 210 may implement the requested QoS bearer change.

Figure 7:
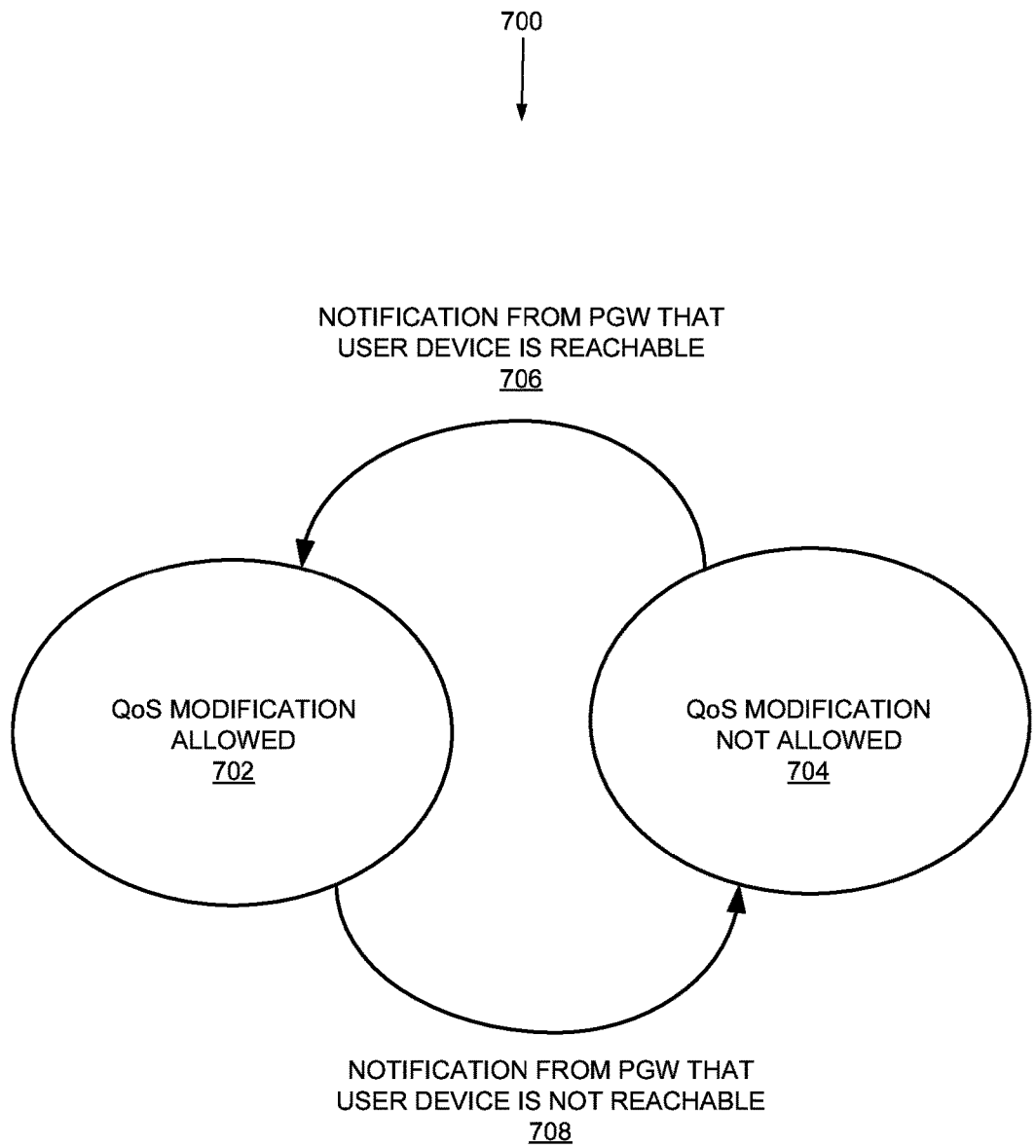
FIG. 7 illustrates exemplary state transition diagram of the PCRF of FIG. 2.

FIG. 7 illustrates an exemplary state transition diagram 700 for PCRF 220. State transition diagram 700 is associated with process 500. As shown, PCRF 220 may be in one of two possible states: QoS modification allowed state 702 and QoS modification not allowed state 704.

PCRF 220 may enter QoS modification allowed state 702 (from QoS modification not allowed state 704) when PCRF receives a message, from PGW 216, that user device 102 is reachable (arc 706). Similarly, PCRF 220 may enter QoS modification not allowed state 704 (from QoS modification allowed state 702) when PCRF receives a message from PGW 216, that user device 102 is not reachable (arc 708).

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 5A and 5B and the messaging diagram of FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
  receiving, from a Packet Data Network Gateway (PGW), an indication that a user equipment device (UE) has established an Internet Protocol (IP) session through a network;
  subscribing to a notification service, at the PGW, that indicates whether the UE is reachable;
  determining that quality-of-service (QoS) for the UE needs to be modified;
  sending a first request, to the PGW, to modify a bearer for the UE in response to the determination that the QoS for the UE needs to be modified;
  receiving a first reply, from the PGW, that an attempt to modify the QoS for the UE has failed because the UE is unreachable;
  receiving a notification, from the notification service at the PGW, that the UE is reachable;
  determining whether the QoS for the UE still needs to be modified in response to the notification;
  sending a second request to the PGW in response to determining that the QoS for the UE still needs to be modified; and
  sending a third request to the PGW to cancel further attempts to modify the QoS for the UE in response to determining that the QoS for the UE does not need to be modified.

2. The method of claim 1, wherein the UE is unreachable when the UE is in a Power Savings Mode (PSM) or Extended Discontinuous Reception (eDRX).

3. The method of claim 1, wherein the second request comprises a request to change the bearer for the UE.

4. The method of claim 1, wherein, in response to the first request to modify the bearer for the UE, the PGW sends a message to another network device to modify the bearer for the UE.

5. The method of claim 1, wherein determining that QoS for the UE needs to be modified includes:

determining that QoS for the UE needs to be modified based on Policy and Charging Control (PCC).

6. A non-transitory computer-readable medium comprising computer-executable instructions, that when executed by one or more processors, cause the one or more processors to:
receive, from a Packet Data Network Gateway (PGW), an indication that a user equipment device (UE) has established an Internet Protocol (IP) session through a network;
subscribe to a notification service, at the PGW, that indicates whether the UE is reachable;
determine that quality-of-service (QoS) for the UE needs to be modified;
send a first request, to the PGW, to modify a bearer for the UE in response to the determination that the QoS for the UE needs to be modified;
receive a first reply, from the PGW, that an attempt to modify the QoS for the UE has failed because the UE is unreachable;
receive a notification, from the notification service at the PGW, that the UE is reachable;
determine whether the QoS for the UE still needs to be modified in response to the notification;
send a second request to the PGW when the one or more processors determine that the QoS for the UE still needs to be modified, and
send a third request to the PGW to cancel further attempts to modify the QoS for the UE when the one or more processors determine that the QoS for the UE does not need to be modified.

7. The non-transitory computer-readable medium of claim 6, wherein the UE is unreachable when the UE is in a Power Savings Mode (PSM) or Extended Discontinuous Reception (eDRX).

8. The non-transitory computer-readable medium of claim 6, wherein the second request comprises a request to change the bearer for the UE.

9. The non-transitory computer-readable medium of claim 6, wherein, in response to the first request to modify the bearer for the UE, the PGW sends a message to another network device to modify the bearer for the UE.

10. The non-transitory computer-readable medium of claim 6, wherein when the one or more processors determine that QoS for the UE needs to be modified, the one or more processors are to:
determine that QoS for the UE needs to be modified based on Policy and Charging Control (PCC).

11. A network device comprising:
a communication interface;
a memory for storing instructions;
a processor for executing the instructions to:
receive, from a Packet Data Network Gateway (PGW), an indication that a user equipment device (UE) has established an Internet Protocol (IP) session through a network;
subscribe to a notification service, at the PGW, that indicates whether the UE is reachable in response to the indication;
determine that quality-of-service (QoS) for the UE needs to be modified;
send a first request, to the PGW, to modify a bearer for the UE in response to the determination that the QoS for the UE needs to be modified;
receive a first reply, from the PGW, that an attempt to modify the QoS for the UE has failed because the UE is unreachable;
receive a notification, from the notification service at the PGW, that the UE is reachable;
determine whether the QoS for the UE still needs to be modified in response to the notification;
send a second request to the PGW when the processor determines that the QoS for the UE still needs to be modified; and
send a third request to the PGW to cancel further attempts to modify the QoS for the UE when the processor determines that the QoS for the UE does not need to be modified.

12. The network device of claim 11, wherein the UE is unreachable when the UE is in a Power Savings Mode (PSM) or Extended Discontinuous Reception (eDRX).

13. The network device of claim 11, where the notification, the second request comprises a request to change the bearer for the UE.

14. The network device of claim 11, wherein, in response to the first request to modify the bearer for the UE, the PGW sends a message to another network device to modify the bearer for the UE.

15. The network device of claim 11, wherein when the processor determines that QoS for the UE needs to be modified, the processor is configured to:
determine that QoS for the UE needs to be modified based on Policy and Charging Control (PCC).

16. The method of claim 4, wherein the other network device includes a Mobility Management Entity (MME).

17. The non-transitory computer-readable medium of claim 9, wherein the other network device includes a Mobility Management Entity (MME).

18. The network device of claim 14, wherein the other network device includes a Mobility Management Entity (MME).

19. The method of claim 1, wherein the device includes a Policy and Charging Rules Function (PCRF).

20. The non-transitory computer-readable medium of claim 6, wherein the device includes a Policy and Charging Rules Function (PCRF).

* * * * *